3,019,109
STABILIZATION OF ANTIBIOTICS IN FEEDS
AND FEED SUPPLEMENTS
Irving Klothen, Princeton, N.J., assignor to American Cyanamid Company, New York, N.Y., a corporation of Maine
No Drawing. Filed May 10, 1960, Ser. No. 28,013
6 Claims. (Cl. 99—2)

This invention relates to the stabilization of animal and poultry feed containing chlortetracycline and more particularly is concerned with a novel process of preparing animal feeds or animal feed supplements which are stable upon prolonged storage against loss of antibiotic potency.

In recent years the use of antibiotics in animal feeds for improving growth characteristics and efficiency of feed utilization has become of considerable economic importance. One of the best of such procedures is described in the United States patent to Jukes No. 2,619,420 which involves the addition to animal feeds of the antibiotics produced by fermentation of an aqueous nutrient medium with the microorganism *Streptomyces aureofaciens*. In practice, the fermentation mash solids are harvested, after the fermentation has been continued for the requisite length of time, and dried. The dried harvest mash containing the antibiotics produced by the microorganism *Streptomyces aureofaciens* can be used as an animal feed supplement or may be blended with conventional animal feed materials to produce a nutritionally-balanced growth accelerating animal feed.

The use of the dried chlortetracycline-containing fermentation harvest mash solids as an animal or poultry feed supplement has from the beginning presented very vexing problems particularly the loss of potency of the antibiotic in the feed or feed supplement upon prolonged storage. This loss of antibiotic potency, and which frequently runs as high as 20% over a one-year storage period, has heretofore necessitated the addition of a suitable overage of dried harvest mash antibiotic-containing solids to the animal feed blend so as to maintain the antibiotic potency during storage. Such a procedure is unsatisfactory and among other things results in higher than desired manufacturing costs for these animal feed supplements.

The present invention is based upon the surprising discovery that (1) by the addition of calcium hydroxide to an animal feed supplement, and which preferably is in the form of dried harvest mash solids with or without other feed materials and containing from 1 to 50 grams of chlortetracycline per pound, so as to raise or maintain the pH of the supplement to a pH of between about 7 and 12, and preferably 8.5–11.5, and (2) thereafter subjecting the so-treated supplement to a pelleting or agglomerating operation so as to produce pellets or crumbles having a particle size of the order of from 10 to 60 mesh, it has been found that the resultant feed supplement is stable upon prolonged storage against loss in antibiotic potency.

The present invention has the further and distinct advantage over the use of calcium hydroxide alone in that the feed supplement pellets can be blended or diluted with conventional animal or poultry feed materials so that the final animal feed is itself stabilized against loss in antibiotic potency. This desirable result probably occurs because the treated feed supplement is maintained in discrete particles and thus is not influenced as greatly by the adverse environment of the animal feed which unless treated with excessively large amounts of calcium hydroxide cannot readily be stabilized.

In carrying out the present invention from about .2 to about 12% pulverized calcium hydroxide is mixed with chlortetracycline fermentation cake together with suitable diluents to form a feed supplement containing from about 1 to about 50 grams of chlortetracycline per pound. This mixture is then sized into pellets approximately 3/16 inch in size with as little increase in moisture and temperature as is consistent with good pelleting operations. The pellets after being cooled are crumbled into a particle size consistent with general particle size of the feed into which they are to be added, and also taking into consideration uniform distribution of such particles throughout the feed in such quantity that all animals can reasonably be expected to get an equal effective dose per feeding. Generally this particle size will range approximately from 10 to 60 mesh. Alternatively, a small pellet such as one 3/32 of an inch in diameter can be produced, immediately yielding a product of the desired final particle size.

The pelleting operation can be carried out by any suitable equipment available commercially which will produce the desired particle size of the treated feed supplement. Such equipment as pellet mill, hammer mill, etc. may be used satisfactorily. Other compacting or agglomerating techniques such as dry compression or granulation can be used in lieu of the pelleting operation. If desired, the resulting particles can be coated with a protective film to further separate the antibiotic from the feed environment. Suitable coating agents which may be used are gelatinous materials, waxes, polyethylene glycol and hydrogenated fats and oils.

A commercial poultry feed containing 20% crude protein, 4% crude fat and 5% crude fiber was used in the following experiments. This was formulated of the following ingredients:

Riboflavin supplement
D activated animal sterol
Vitamin A feeding oil
Meat and bone scrap
Corn fermentation solubles
Fish meal
Soybean oil meal
Dehydrated alfalfa meal
Corn meal
Wheat standard middlings
Feeding cane molasses
Low fluorine rock phosphate, 2%
Calcium carbonate, 2%
Manganese sulfate, .0125%
Iodized salt, .5%
Calcium pantothenate
Niacin
Animal fat (preserved with butylated hydroxyanisole)

A feed supplement sold commercially under the trademark Aurofac-10 chlortetracycline containing approximately 1–50 grams chlortetracycline per pound and consisting essentially of the following ingredients was prepared:

| | Percent |
|---|---|
| Chlortetracycline fermentation cake | 23 |
| Chlortetracycline fermentation cake | 30 |
| Coconut oil methylester | 1.5 |
| Solvent extract soybean feed | 45.5 |

The invention will be described in greater detail in conjunction with the following specific examples.

EXAMPLE 1

Aurofac-10 chlortetracycline was used in a poultry feed of the above composition in a series of experiments with and without the addition of calcium hydroxide to determine losses in antibiotic potencies in the poultry feed after storage under accelerated conditions at 56° C. for two days. After the addition of calcium hydroxide to the feed supplement it was pelleted into 3/16 inch pellets and the so-treated feed supplement was then sized through a U.S. standard sieve No. 20 and retained on a U.S. standard sieve No. 30. The results obtained are shown in the following table.

*Table*

| Composition | Percent Moisture | Average Initial Assay (Microbiological) | Antibiotic Recovery After Storage as Percent of Initial Assay 56° C.—2 Days |
|---|---|---|---|
| Aurofac-10 in Poultry Feed | 17.6 | 204.5 | 64.5 |
| Aurofac-10 Crumbles in Poultry Feed | 17.6 | 185.5 | 66.0 |
| Aurofac-10 in Poultry Feed with 5% Ca(OH)₂ | 17.3 | 181.5 | 71.0 |
| Aurofac-10 Crumbles in Poultry Feed with 5% Ca(OH)₂ | 17.4 | 167.5 | 89.5 |
| Aurofac-10 [1] in Poultry Feed CTC/calcium caseinate with 5% Ca(OH)₂ | 17.3 | 184.5 | 78.5 |
| Aurofac-10 [1] Crumbles in Poultry Feed CTC/calcium caseinate with 5% Ca(OH)₂ | 17.5 | 185.0 | 82.5 |

[1] Chlortetracycline/calcium caseinate complex was used in lieu of chlortetracycline fermentation cake. This material has a potency of 60% and was used at 4.3% of the total blend. The remaining diluent was supplied from soybean feed.

I claim:

1. A process for the production of an animal feed composition comprising an edible animal feedstuff containing the growth-promoting factors produced by elaboration of the microorganism *Streptomyces aureofaciens* which comprises adding to an animal feed supplement containing said growth-promoting factors calcium hydroxide in an amount ranging from about .2 to 12% by weight of the feed supplement, and subjecting the so-treated supplement to a sizing operation so as to produce a particle size of between 10 and 60 mesh whereby the feed supplement when added to a major amount of an edible animal feedstuff will be stable against losses in antibiotic potency for extended periods of time.

2. A process for the production of an animal feed composition comprising a nutritionally-balanced animal feed containing the growth-promoting factors produced by elaboration of the microorganism *Streptomyces aurofaciens* which comprises adding to an animal feed supplement containing said growth-promoting factors calcium hydroxide in an amount ranging from about .2 to 12% by weight of the feed, and subjecting the so-treated supplement to a sizing operation so as to produce a particle size of between 10 and 60 mesh whereby the supplement when added to a major amount of a nutritionally-balanced animal feed will be stable against losses in antibiotic potency for extended periods of time.

3. A process for the production of an animal feed composition comprising a nutritionally-balanced animal feed containing chlortetracycline which comprises adding to an animal feed supplement containing chlortetracycline calcium hydroxide in an amount ranging from about .2 to 12% by weight of the feed and subjecting the so-treated supplement to a sizing operation so as to produce a particle size of between 10 and 60 mesh whereby the supplement when added to a major amount of a nutritionally-balanced animal feed will be stable against losses in antibiotic potency for extended periods of time.

4. An animal feed composition prepared according to claim 1.

5. An animal feed composition prepared according to claim 2.

6. An animal feed composition prepared according to claim 3.

No references cited.